(12) United States Patent
Sekich et al.

(10) Patent No.: US 11,433,702 B1
(45) Date of Patent: Sep. 6, 2022

(54) HOLONOMIC DRIVETRAIN MODULES FOR MOBILE ROBOTS

(71) Applicant: Amazon Technologies, Inc., Seattle, WA (US)

(72) Inventors: Daniel Sekich, Loveland, CO (US); Phillip Walkemeyer, Boulder, CO (US); Jacob Blacksberg, Boulder, CO (US); Jonathan McQueen, Boulder, CO (US); Nima Keivan, Boulder, CO (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 531 days.

(21) Appl. No.: 16/582,394

(22) Filed: Sep. 25, 2019

(51) Int. Cl.
| | |
|---|---|
| *B60B 33/00* | (2006.01) |
| *B60R 16/02* | (2006.01) |
| *B60K 7/00* | (2006.01) |
| *B62D 5/04* | (2006.01) |
| *B62B 3/00* | (2006.01) |
| *B62D 9/00* | (2006.01) |
| *B62B 5/00* | (2006.01) |
| *G05D 1/00* | (2006.01) |

(52) U.S. Cl.
CPC ........ *B60B 33/0068* (2013.01); *B60K 7/0007* (2013.01); *B60R 16/02* (2013.01); *B62B 3/001* (2013.01); *B62B 5/004* (2013.01); *B62D 5/04* (2013.01); *B62D 9/00* (2013.01); *G05D 1/0088* (2013.01); *G05D 2201/0216* (2013.01)

(58) Field of Classification Search
CPC ... B60B 33/0068; B60K 7/0007; B60R 16/02; B62B 3/001; B62B 5/004; B62D 5/04; B62D 9/00; G05D 1/0088; G05D 2201/0216
USPC ........................................................ 180/236
See application file for complete search history.

(56) References Cited

U.S. PATENT DOCUMENTS

| | | | |
|---|---|---|---|
| 8,430,192 B2 * | 4/2013 | Gillett .............. | H04M 1/72415 180/2.2 |
| 2018/0370377 A1 * | 12/2018 | Blacksberg ......... | G05D 1/0234 |
| 2019/0135551 A1 * | 5/2019 | Sekich ................. | B65G 47/34 |
| 2019/0179329 A1 * | 6/2019 | Keivan ............... | G05D 1/0214 |

* cited by examiner

*Primary Examiner* — Gertrude Arthur Jeanglaude
(74) *Attorney, Agent, or Firm* — Eversheds Sutherland (US) LLP

(57) ABSTRACT

Systems and methods are disclosed for holonomic drivetrain modules for mobile robots. In one embodiment, an example mobile robot may include a chassis, and a holonomic drivetrain module removably coupled to the chassis. The holonomic drivetrain module may include a first drive wheel having a caster angle of substantially zero, a first bearing block assembly vertically aligned with the first drive wheel, and a first steer motor coupled to the first bearing block assembly and vertically aligned with the first drive wheel.

20 Claims, 9 Drawing Sheets

HOLONOMIC DRIVETRAIN MODULES FOR MOBILE ROBOTS

BACKGROUND

Robots may be used to assist humans with various tasks. For example, certain types of robots may be used to pick up or transport items, whereas other types of robots may be used to pack and ship items. Some robots may be configured to drive or otherwise move autonomously or semi-autonomously. In order to perform different functions, robots may need to move from one place to another. Navigating certain spaces, such as warehouses, may be difficult due to space constraints, obstacles, and other factors. Accordingly, increased ranges of motion and improved motor control of mobile robots may be desired.

Figure 1:
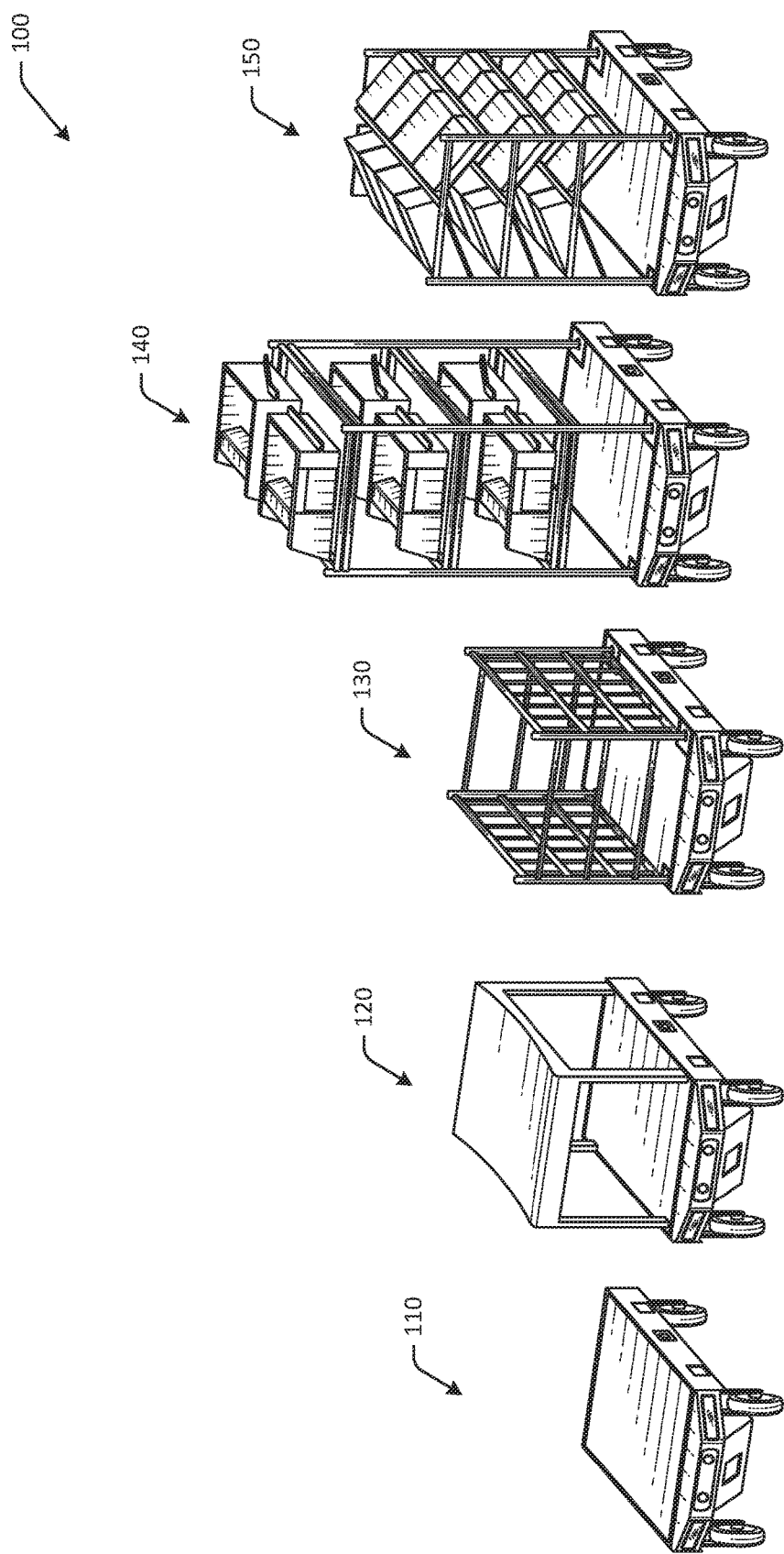
FIG. 1 is a schematic illustration of example use cases for holonomic drivetrain modules for mobile robots in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Robots may be used in various facilities, such as fulfillment centers and other facilities. Certain robots may be autonomous or semi-autonomous. For example, some robots may be configured to automatically move from a first location to a second location without manual operation or direction. Some robots may be fitted with attachments or other components depending on desired functionality. For example, a mobile robot may be equipped with a cart, container, shelving, or other components that may be used to transport items or products. In a particular example, a mobile robot may have a flat surface on which one or more shelves may be mounted. Items may be placed on the shelves, and the mobile robot may autonomously deliver the items, or move the items, from one location to another. In another example, a container or sidewalls may be mounted on the mobile robot, and certain items, such as round balls or other difficult to secure items may be transported by the mobile robot. As a result, the mobile robots may assist in the transport of equipment (e.g., robotic arms, cranes, lighting indicators, etc.) and/or items, thereby reducing manual effort and increasing efficiency and safety.

Different environments may have different movement constraints or characteristics for mobile robots. For example, some environments may have relatively more or less space for mobile robots to operate due to layout, obstacles, other vehicles, personnel, and so forth. As a result, maneuverability of mobile robots may impact the number and complexity of tasks a mobile robot is able to facilitate, and may impact the complexity of navigating certain environments. For example, if a mobile robot has a large turning radius, then space requirements may be increased, as well as computational complexity for management of a fleet of autonomous mobile robots. In addition, a number of obstacles may increase due to the increased space requirements.

Embodiments of the disclosure include mobile robots with modular holonomic drivetrains, thereby allowing the mobile robots to move with holonomic motion. Holonomic locomotion or drive may be an ability to move in any and/or all directions, where individual wheels of the respective mobile robots may rotate independently of each other. Some embodiments may include vertically aligned wheel and drive shafts, such that individual wheels of the mobile robot may not have any caster angle, or any biased direction of movement responsive to force. Individual wheels of the mobile robots described herein may optionally be independent controlled (e.g., powered, steered, etc.), and may therefore include individual steer motors on one or more, or each, wheel. Mobile robots may therefore be able to move forward, reverse, side-to-side (e.g., crabbing, etc.), or in any other direction via control of individual wheel directions.

Referring to FIG. 1, example use cases 100 for holonomic drivetrain modules for mobile robots are depicted in accordance with one or more embodiments of the disclosure. Although discussed in the context of certain examples of autonomous cart functionality, other embodiments may be directed to any suitable use case where items may be transported.

FIG. 1 illustrates example mobile robot configurations with different types of supports and/or attachments. For example, a first mobile robot 110 may be a mobile robot with a flat upper surface on which various items can be positioned for transport. A second mobile robot 120 may be a mobile robot with four rectangular vertical supports and a table top surface coupled to the supports, so as to form a cart configuration. A third mobile robot 130 may be a mobile robot with four circular vertical supports and sidewalls coupled to the supports, so as to form a container configuration. A fourth mobile robot 140 may be a mobile robot with four circular vertical supports and flat shelving coupled to various points along the supports, thereby forming a first shelving configuration. A fifth mobile robot 150 may be a mobile robot with four circular vertical supports and angled shelving coupled to various points along the supports, thereby forming a second shelving configuration. Other configurations of the mobile robot may be included, along with different attachment types.

The various examples illustrated in FIG. 1 may include holonomic drivetrain modules, as described herein, that may allow for the respective mobile robots to be move with holonomic locomotion. As a result, range of motion and mobile robot functionality may be increased.

Example embodiments of the disclosure provide a number of technical features or technical effects. For example, in accordance with example embodiments of the disclosure, certain embodiments of the disclosure may improve range of motion, durability, reparability, and reconfiguration time and/or efficiency of mobile robots. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 2:
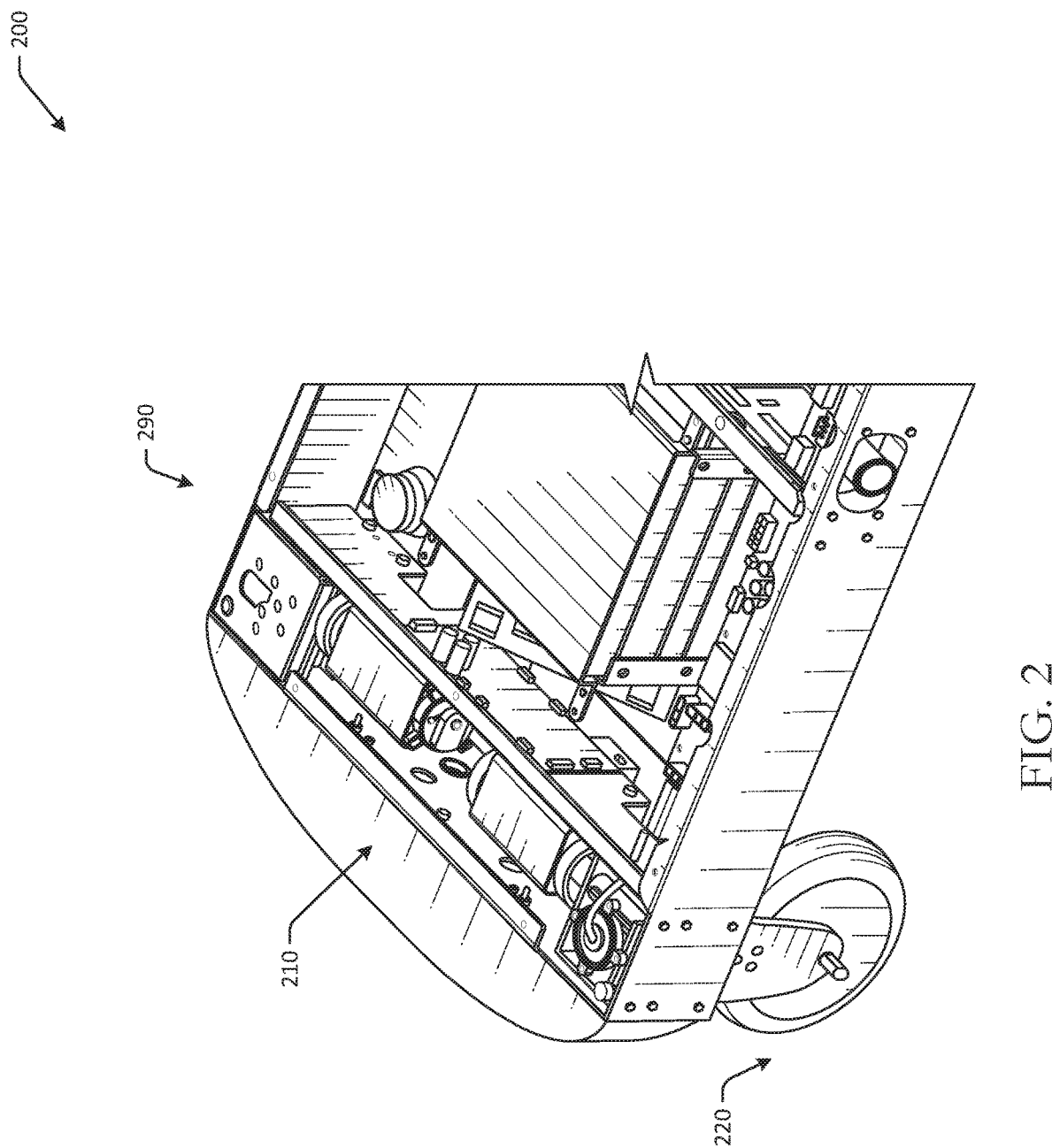
FIG. 2 is a schematic illustration of an example holonomic drivetrain module coupled to a mobile robot in accordance with one or more embodiments of the disclosure.

FIG. 2 is a schematic illustration of an example holonomic drivetrain module 210 coupled to a mobile robot 200 in accordance with one or more embodiments of the disclosure. Other embodiments may include additional or fewer components. The illustration of FIG. 2 may not be to scale, and may not be illustrated to scale with respect to other figures. The holonomic drivetrain module illustrated in FIG. 2 may be the same holonomic drivetrain module discussed with respect to FIG. 1.

The holonomic drivetrain module 210 may be removably coupled to the mobile robot 200. In some embodiments, the holonomic drivetrain module 210 may be disposed within the mobile robot 200. The holonomic drivetrain module 210 may be coupled to a chassis of the mobile robot 200. The holonomic drivetrain module 210 may be modular in that the holonomic drivetrain module 210 may be removable and/or replaceable as a single unit. For example, if repairs are need to any portion of the holonomic drivetrain module 210, the entire holonomic drivetrain module 210 may be quickly removed from the mobile robot 200, and may be replaced with another holonomic drivetrain module, so as to reduce downtime of the mobile robot 200. The damaged or removed holonomic drivetrain module 210 may then be serviced at a bench or other location.

The holonomic drivetrain module 210 may include a first drive wheel assembly 220 at a first side of the holonomic drivetrain module 210, and a second drive wheel assembly 290 at a second side of the holonomic drivetrain module 210. The respective drive wheel assemblies may include a number of components to provide holonomic locomotion to the mobile robot 200. The mobile robot 200 may be configurable with one or more drive wheels, such as two-wheel drive, four-wheel drive, six-wheel drive, and so forth. The respective drive wheel assemblies may have a direct drive configuration of a steer motor to steer axle, which may eliminate the need for belts, pulleys, or couplers. As a result, overall stack height may be minimized, and predictable and repeatable control over direction may be provided without maintenance. Accordingly, the holonomic drivetrain module 210 may provide robust, economic, and powerful holonomic steering without complicated mechanisms.

As discussed with respect to FIGS. 3-8, the holonomic drivetrain module 210 may include a first drive wheel having a caster angle of substantially zero, a first bearing block assembly vertically aligned with the first drive wheel, and a first steer motor coupled to the first bearing block assembly and vertically aligned with the first drive wheel. In some embodiments, the holonomic drivetrain module 210 may include a set of independently controlled wheel assemblies, such as the first drive wheel assembly 220 and the second drive wheel assembly 290, where some or each of the independently controlled wheel assemblies include a drive wheel (or a non-drive wheel, where a drive wheel includes a motor (e.g., internal/in-wheel electric motor, etc.) and a non-drive/idle wheel does not) coupled to a wheel yoke, where the drive wheel is casterless or does not have a default caster angle. Some embodiments may include one or more encoders, such as a rotary encoder, that may be configured to determine a position of a respective drive wheel, and/or to align the drive wheel to a certain position. The holonomic drivetrain module 210 may include wheel assemblies where a bearing block assembly, wheel yoke assembly, and hollow shaft steer motor are vertically aligned. Mobile robots and/or the holonomic drivetrain module 210 may include a power cable coupled to the drive wheel and a power supply, where the power cable is routed through the hollow steer axle and a hollow shaft of the hollow shaft steer motor. Due to the structural components of the holonomic drivetrain module 210, a load from the autonomous cart or mobile robot, in addition to a load from a payload, may be transferred from the bearing block assembly to the chassis. Some embodiments may include a plurality of wheel assemblies, such as four independently controlled wheel assemblies, where each of the independently controlled wheel assemblies may be configured to rotate the respective drive wheels in independent directions in an angular range of at least 180 degrees, such as about 200 degrees, 208 degrees, 238 degrees, 250 degrees, 360 degrees, and/or configured to complete full continuous revolutions. In some instances, with 300 degrees or more angular rotation, a snapback effect may be avoided, where an increased range of motion may be available in some instances without having to reset a position of a wheel or return to an original position before the wheel is operated.

Figure 3:
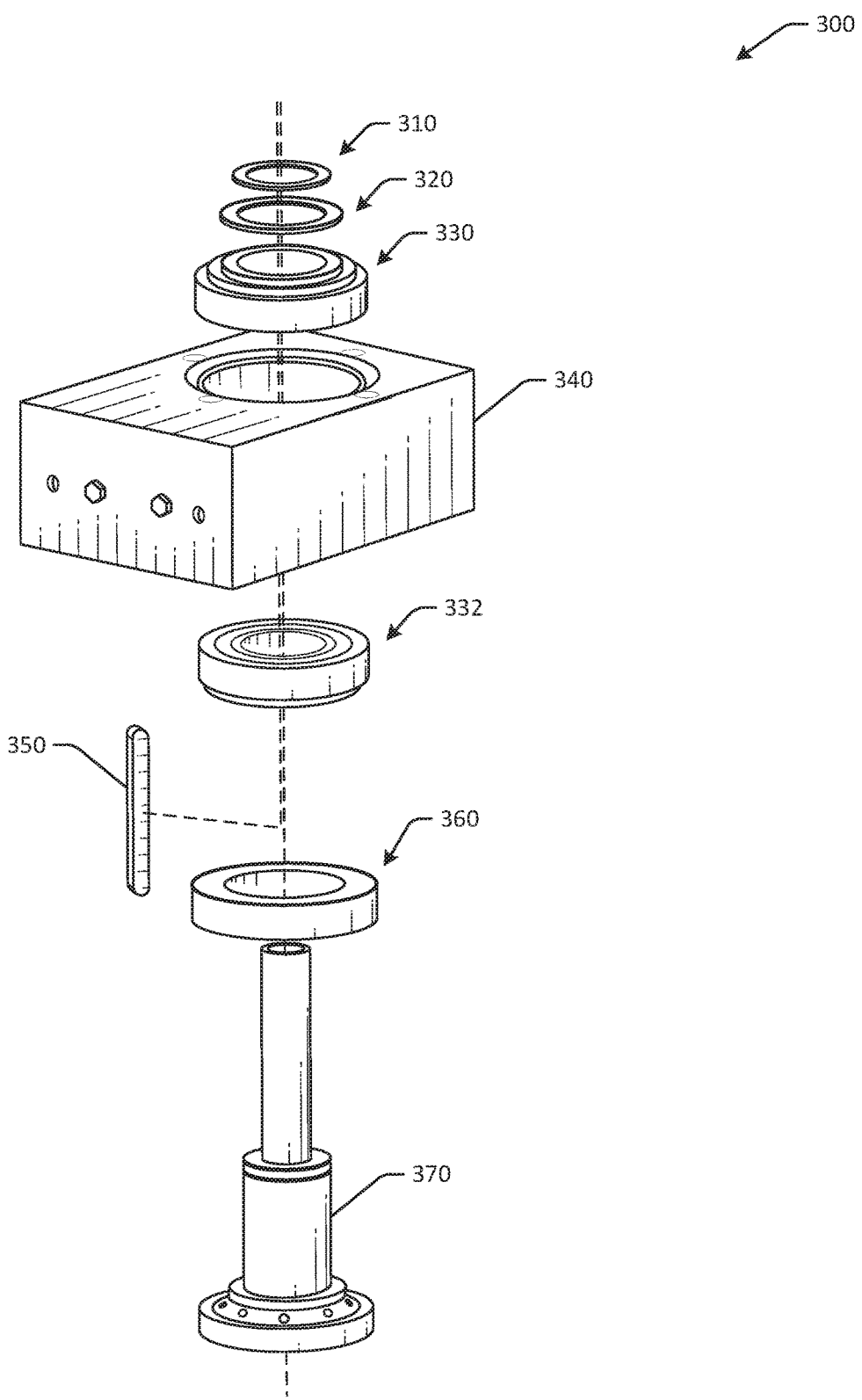
FIG. 3 is a schematic illustration of an example bearing block assembly of a holonomic drivetrain module in exploded view in accordance with one or more embodiments of the disclosure.

FIG. 3 is a schematic illustration of an example bearing block assembly 300 of a holonomic drivetrain module in exploded view in accordance with one or more embodiments of the disclosure. Other embodiments may include additional or fewer components. The illustration of FIG. 3 may not be to scale, and may not be illustrated to scale with respect to other figures. The bearing block assembly 300 illustrated in FIG. 3 may be the same bearing block assembly discussed with respect to FIG. 2.

The bearing block assembly 300 may be a part of a holonomic drivetrain module, and may be configured to transfer a load resulting from a cart and/or payload of a mobile robot to a cart chassis instead of, for example, a steer motor. In some embodiments, a holonomic drivetrain module may include more than one bearing block assembly 300, such as one bearing block assembly 300 for each wheel assembly.

The bearing block assembly 300 may include a retaining ring 310, a Bellville disc spring 320 disposed adjacent to the retaining ring 310, a first tapered roller bearing 330, and a second tapered roller bearing 332. The bearing block assembly 300 may include a machine key 350, a foam axle seal 360, and a hollow steer axle 370.

The bearing block assembly 300 may include a bearing block 340. In the exploded view of FIG. 3, the components of the bearing block assembly 300 are depicted in an unassembled view. When assembled, the retaining ring 310, Bellville disc spring 320, first tapered roller bearing 330, second tapered roller bearing 332, machine key 350, and foam axle seal 360 may be disposed within an aperture formed in the bearing block 340. The first tapered roller bearing 330 and the second tapered roller bearing 332 may be disposed adjacent to each other in a back-to-back arrangement and positioned within an aperture through the bearing block assembly 300.

The hollow steer axle 370 may be disposed through an aligned opening extending through the components of the bearing block assembly 300. The hollow steer axle 370 may include a hollow shaft, such that components of the mobile robot, such as a power cable or cord, may be routed through the hollow steer axle 370. The hollow steer axle 370 may be direct driven by a steer motor of the wheel assembly.

The bearing block assembly 300 may be vertically aligned with other components of the wheel assembly of a holonomic drivetrain, such as a wheel yoke assembly, a wheel, and/or hollow shaft steer motor, such that a wheel coupled to the assembly has a caster angle of zero or substantially zero.

A load from a cart/robot weight and payload weight may be carried by the first tapered roller bearing 330 and the second tapered roller bearing 332, which may transfer the load directly to a chassis of the cart. The first tapered roller bearing 330 and the second tapered roller bearing 332 may be capable of carrying relatively large thrust and lateral loads. The bearing block assembly 300 may therefore isolate a steer motor from the load path, which may allow for the use of a smaller motor and gearbox than would otherwise be necessary. With the bearing block assembly 300 carrying the thrust and lateral loads, the steer motor and gearbox may serve to provide torque to steer the wheel. The bearing block assembly 300 may therefore allow for some or all wheel of the holonomic drivetrain module to be steered through approximately 330 to 360 degrees of rotation, or 167 to 180 degrees either direction from center. The mobile robot may therefore traverse in the X or Y direction at any time due the additional degrees of freedom offered by holonomic steering functionality.

Figure 4:
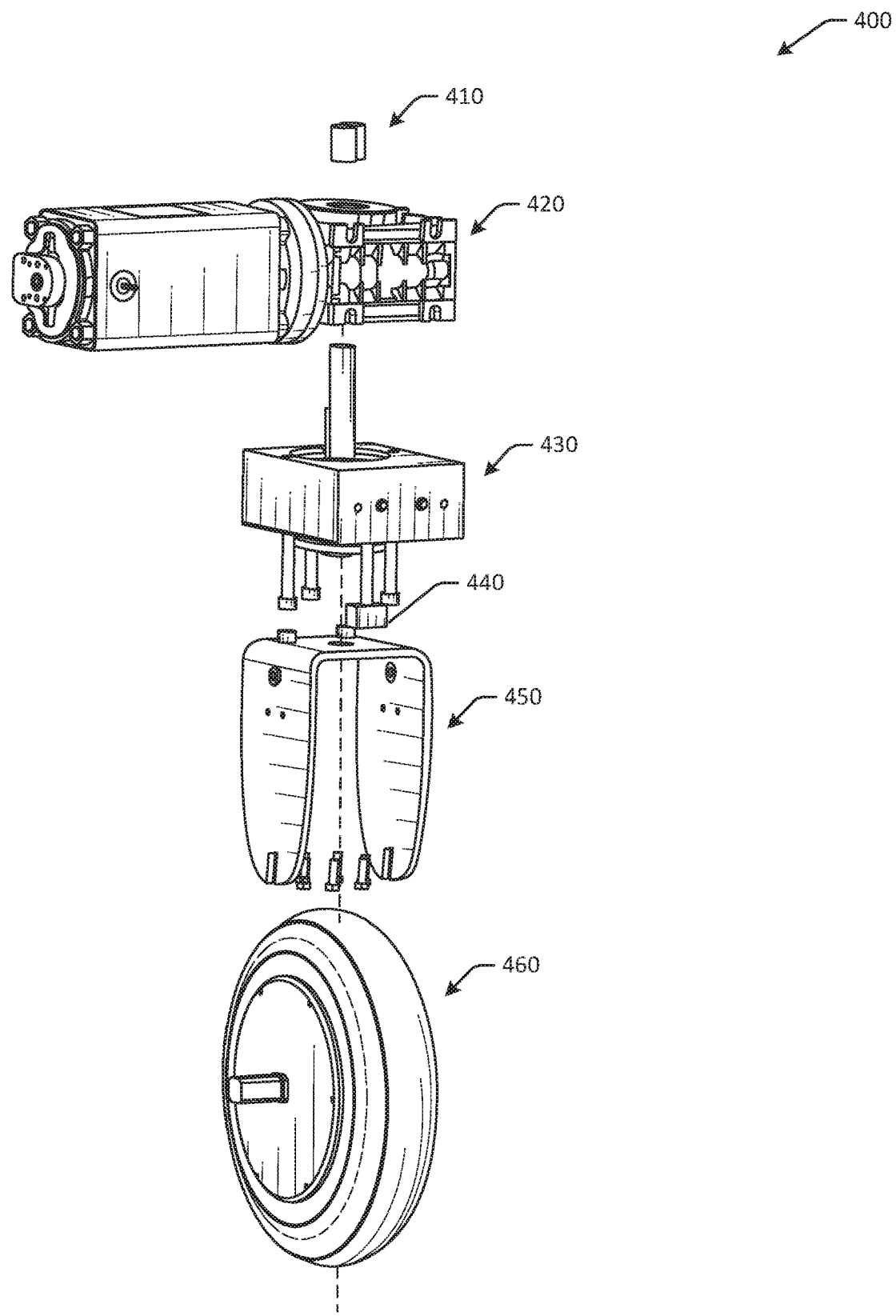
FIG. 4 is a schematic illustration of an example steer motor assembly of a holonomic drivetrain module in exploded view in accordance with one or more embodiments of the disclosure.

FIG. 4 is a schematic illustration of an example steer motor assembly 400 of a holonomic drivetrain module in exploded view in accordance with one or more embodiments of the disclosure. Other embodiments may include additional or fewer components. The illustration of FIG. 4 may not be to scale, and may not be illustrated to scale with respect to other figures. The steer motor assembly 400 illustrated in FIG. 4 may be the same steer motor assembly discussed with respect to FIG. 2.

The steer motor assembly 400 may be configured to independently steer a wheel of the holonomic drivetrain module by imparting a torque on a wheel of the assembly. The holonomic drivetrain module may include one or more steer motor assemblies 400, such as one for each wheel assembly.

The steer motor assembly 400 may include a plastic sleeve bearing 410, a hollow shaft steer motor with gearbox 420, a bearing block assembly 430 (which may be the bearing block assembly 300 of FIG. 3), a fixture key 440, a wheel yoke assembly 450, and a drive wheel 460. In some embodiments, instead of the drive wheel 460, an idle wheel may be included, where the idle wheel is a non-driven wheel.

The drive wheel 460 may include a hub motor or an internal motor, which may be configured to be powered in a forward and/or reverse direction. Accordingly, the drive wheel 460 may generate rotational motion without the use of a differential. The drive wheel 460 (or the hub motor) may be coupled to the wheel yoke assembly 450. The drive wheel 460 may include an inverter and an optional friction brake, and may therefore be configured to provide positive (accelerating) and/or negative (braking) torque.

The bearing block assembly 430 (illustrated in an assembled view in FIG. 4) may be coupled to the wheel yoke assembly 450. The hollow steer axle of the bearing block assembly 430 may engage or otherwise be coupled to the hollow shaft steer motor with gearbox 420. The hollow shaft steer motor with gearbox 420 may be a steer motor with a hollow shaft through which the hollow steer axle of the bearing block assembly 430 may be disposed. The hollow shaft steer motor with gearbox 420 may include an adjacent gearbox used to manage output of the steer motor. The hollow shaft steer motor with gearbox 420 may be configured to move the drive wheel 460 from a 0 degree position at which the mobile robot is directed in a forward or reverse direction to a 90 degree position at which the mobile robot is directed in a sideways direction.

The hollow shaft steer motor with gearbox 420 may be mechanically coupled to a first side of the bearing block assembly 430, and may be configured to direct drive the hollow steer axle of the bearing block assembly 430. The wheel yoke 450 may be coupled to a second side of the bearing block assembly 430.

The plastic sleeve bearing 410 may be used to couple the hollow steer axle to the hollow shaft steer motor with gearbox 420, while providing an opening for routing of a power cable.

The fixture key 440 may be used in conjunction with the machine key 350 of FIG. 3 to determine and/or reset positioning of a wheel, as wheel positioning may not always be known or tracked. For example, to determine a straight line position or other desired alignment, the steer motor may be used to rotate the wheel 460 until the machine key comes into contact with the fixture key 440. In some embodiments, an encoder may be used to determine and/or reset positioning of a wheel to a default (straight or otherwise) position.

As a result of the vertical alignment of the components of the steer motor assembly 400, the drive wheel 460 may have a caster angle of zero or substantially zero. The drive wheel 460 may be configured to independently rotate in an angular range of at least 180 degrees. The caster angle may be determined as the angular displacement of the steering axis from the vertical axis of the drive wheel 460 measured in the longitudinal direction.

In some embodiments, the steer motor assembly 400 may include an encoder, such as a shaft encoder or rotary encoder, that can be used to reset a position of the drive wheel 460. The holonomic drivetrain module may include a set of encoders for some or all of the wheels of the holonomic drivetrain modules. The encoder may be an electro-mechanical device that converts the angular position or motion of a shaft or axle to analog or digital output signals. In some embodiments, encoders may be used to dead reckon a default position, and a number of clicks can be used to determine a desired direction or placement. In such a manner, calibration of wheels may not be needed. Data provided from an encoder of the holonomic drivetrain module may be used for relative positioning as opposed to absolute positioning in some embodiments.

Figure 5:
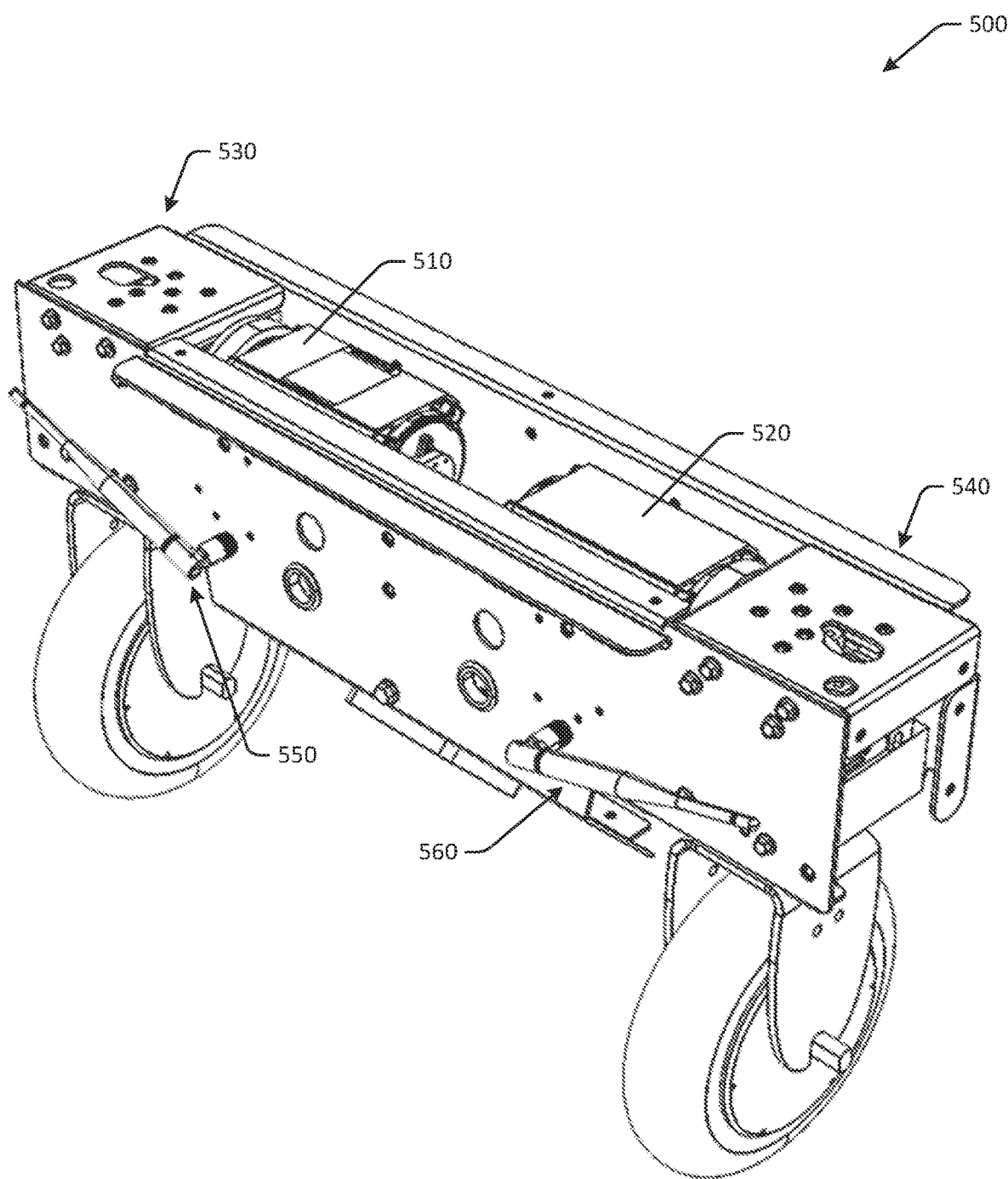
FIGS. 5-6 are schematic illustrations of an example holonomic drivetrain module for mobile robots in various views in accordance with one or more embodiments of the disclosure.
Figure 6:
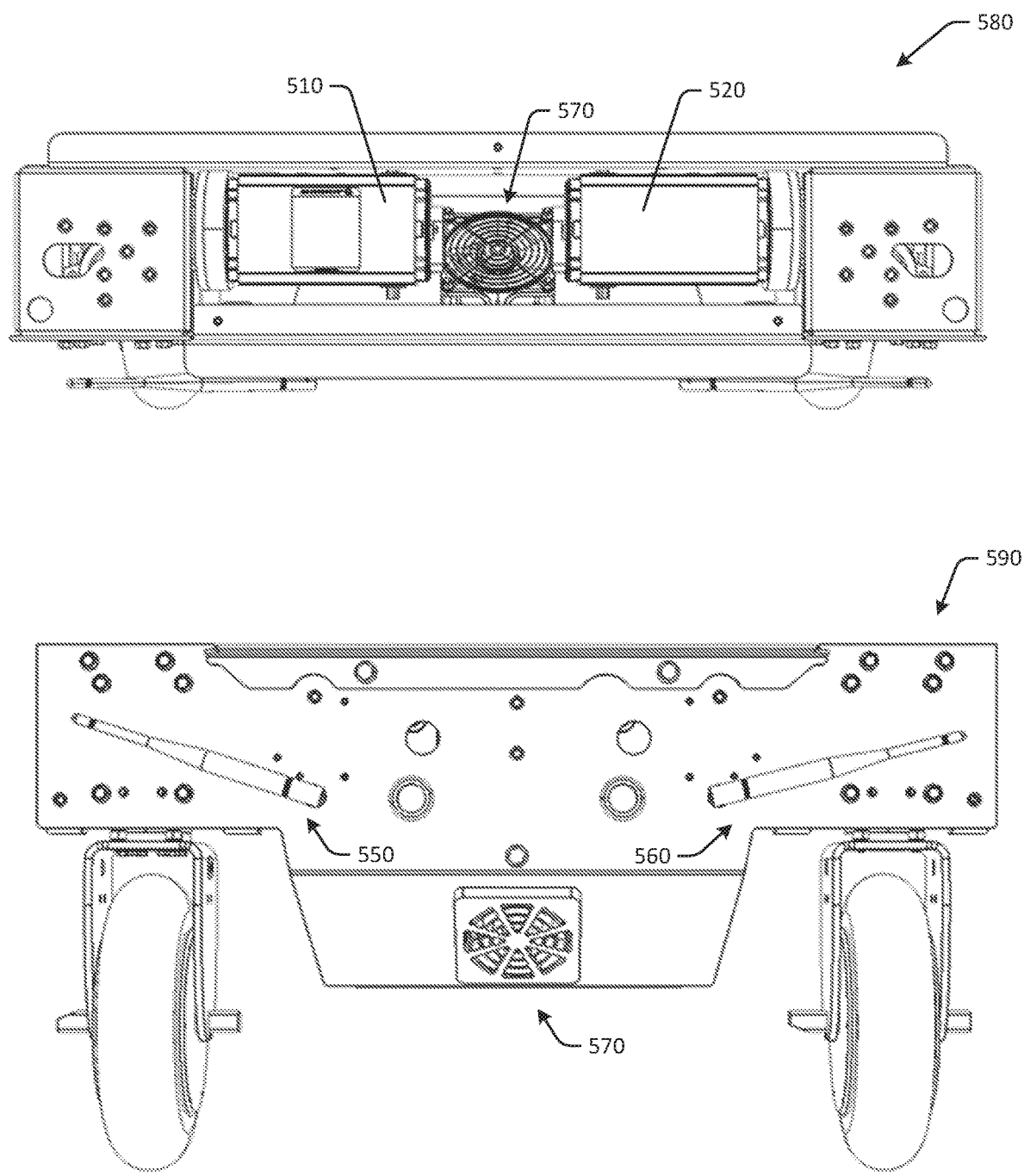

FIGS. 5-6 are schematic illustrations of an example holonomic drivetrain module 500 for mobile robots in various views in accordance with one or more embodiments of the disclosure. Other embodiments may include additional or fewer components. The illustration of FIGS. 5-6 may not be to scale, and may not be illustrated to scale with respect to other figures. The holonomic drivetrain module 500 illustrated in FIGS. 5-6 may be the same holonomic drivetrain module discussed with respect to FIGS. 1-4.

The holonomic drivetrain module 500 is illustrated in perspective view in FIG. 5. The holonomic drivetrain module 500 may include two wheel assemblies. The holonomic drivetrain module 500 may include a first steer motor assembly 510 with a first gearbox and a second steer motor assembly 520 with a second gearbox. The first steer motor assembly 510 may be configured to steer a first wheel of the holonomic drivetrain module 500, and the second steer motor assembly 520 may be configured to drive a second wheel of the holonomic drivetrain module 500.

The holonomic drivetrain module 500 may include one or more anchor points that can be used to couple various attachments, such as the cart structures of FIG. 1, to the holonomic drivetrain module 500 and/or a mobile robot to which the holonomic drivetrain module 500 is coupled. For example, the holonomic drivetrain module 500 may include a first universal anchor point 530 and a second universal anchor point 540, both of which can be used to secure attachments and/or a payload to the mobile robot.

The holonomic drivetrain module 500 may include one or more antennas for wireless communication. For example, the holonomic drivetrain module 500 may include antennas used to receive and/or send data and/or to communicate with other autonomous robots. In the example of FIG. 5, the holonomic drivetrain module 500 may include a first antenna 550 and a second antenna 560.

As illustrated in a top view 580 and rear view 590 of the holonomic drivetrain module 500 in FIG. 6, the holonomic drivetrain module 500 may include a fan 570 to cool the first steer motor assembly 510 and/or the second steer motor assembly 520. The holonomic drivetrain module 500 may include an end cover and/or an inner brace to secure the holonomic drivetrain module 500 to the chassis of a mobile robot and/or protect the components of the holonomic drivetrain module 500.

The holonomic drivetrain module 500 may be configured to be decoupled from the chassis of the mobile robot as a unit. For example, the holonomic drivetrain module 500 may be removable as a single unit or piece, and can be exchanged with another holonomic drivetrain module to reduce downtime due to repair and/or service requirements for the holonomic drivetrain module 500. For example, rather than decommissioning the mobile robot, the holonomic drivetrain module 500 may be swapped and the mobile robot may be returned to service.

Figure 7:
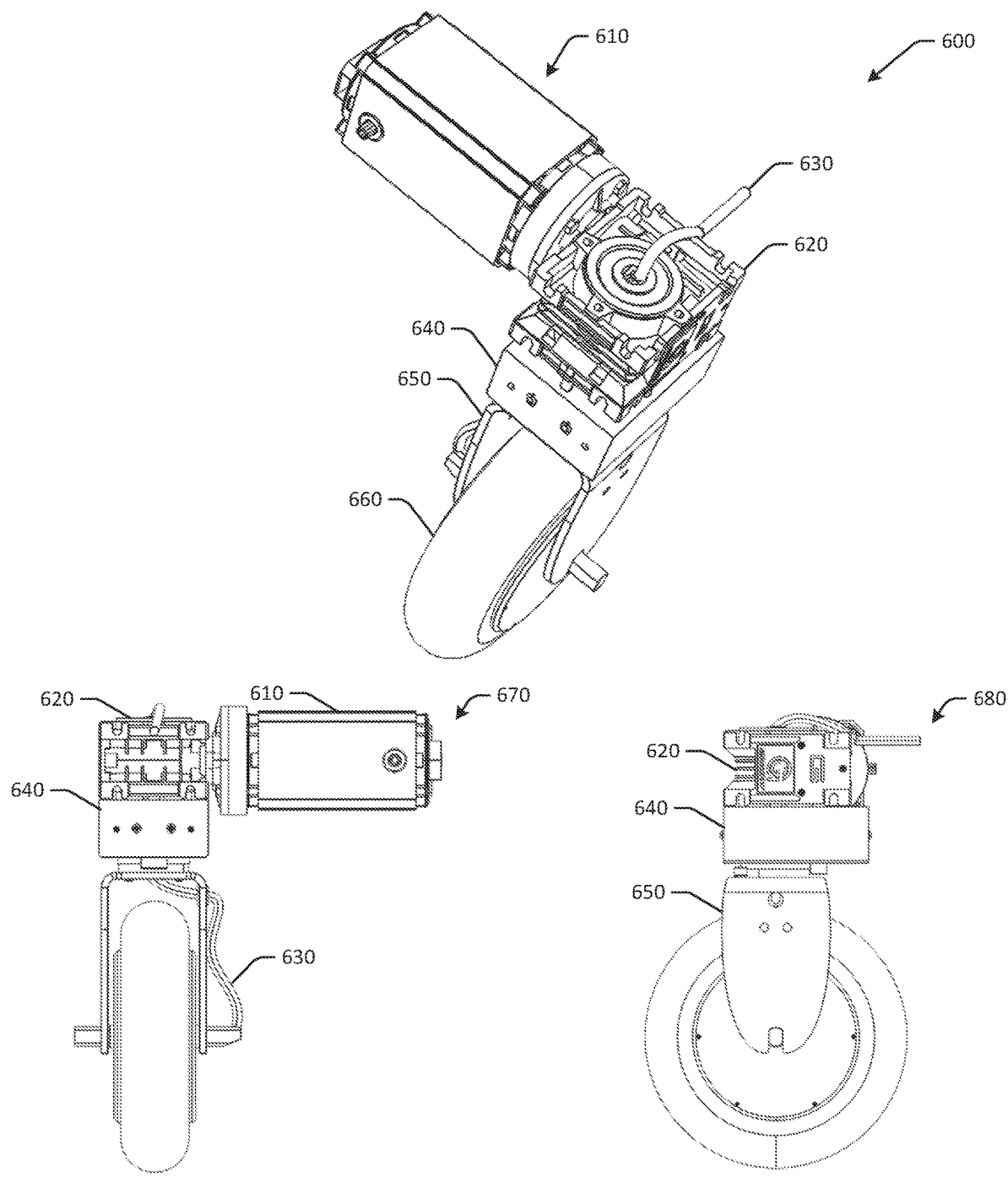
FIG. 7 is a schematic illustration of an example cable routing for a power cable of a holonomic drivetrain module for mobile robots in accordance with one or more embodiments of the disclosure.

FIG. 7 is a schematic illustration of an example cable routing for a power cable of a holonomic drivetrain module for mobile robots in accordance with one or more embodiments of the disclosure. Other embodiments may include additional or fewer components. The illustration of FIG. 7 may not be to scale, and may not be illustrated to scale with respect to other figures.

In FIG. 7, a steer motor assembly 600 is depicted in perspective view. The steer motor assembly 600 may be the same steer motor assembly discussed with respect to FIGS. 4-6. The steer motor assembly 600 may include a steer motor 610, a hollow steer axle 620 (which may be disposed through the gearbox), a bearing block assembly 640 (which may be the bearing block of FIG. 3), a wheel yoke assembly 650, and a drive wheel 660.

The drive wheel 660 may include a hub motor. To operate, the hub motor of the drive wheel 660 may need power. Accordingly, a power cable 630 may be coupled to the drive wheel 660 and a power source of the mobile robot, such as a battery or capacitor. As illustrated in a front view 670, the power cable 630 may be coupled to the drive wheel 660 from an interior side (e.g., a side underneath the mobile robot) through an opening (or around) the wheel yoke assembly 650. As illustrated in an outside view 680, the power cable 630 may not be visible from an outer side of the mobile robot.

The power cable 630 may be routed from the drive wheel 660 up through the hollow shaft of the bearing block assembly 640, and through the hollow steer axle 620 of the steer motor assembly 600. As illustrated in FIG. 7, the plastic bearing of the steer motor assembly 600 may protect the power cable 630 from damage as it exits the steer motor assembly 600.

Accordingly, the power cable 630 may pass through the wheel yoke 650, be routed through the steering axle, and the steer motor. As a result, the power cable 630 may be protected from external damage and may be held securely in place.

Figure 8:
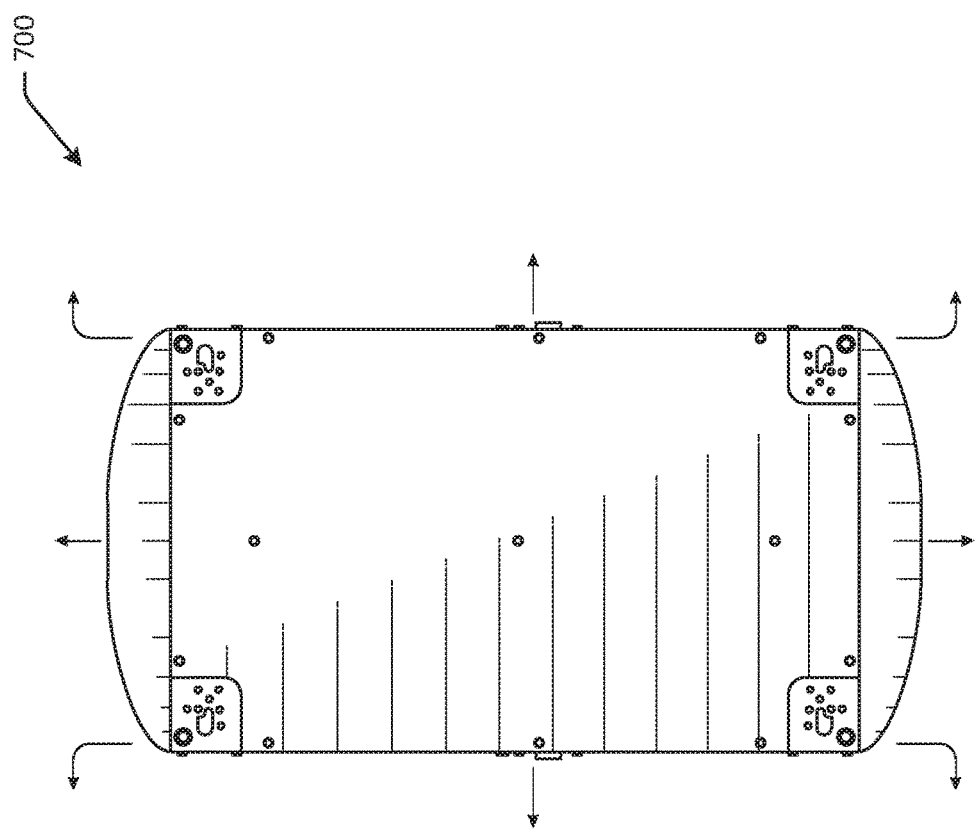
FIG. 8 is a schematic illustration of an example range of motion for a mobile robot having a holonomic drivetrain module in accordance with one or more embodiments of the disclosure.

FIG. 8 is a schematic illustration of an example range of motion for a mobile robot 700 having a holonomic drivetrain module in accordance with one or more embodiments of the disclosure. Other embodiments may include additional or fewer components. The illustration of FIG. 8 may not be to scale, and may not be illustrated to scale with respect to other figures. The mobile robot 700 illustrated in FIG. 8 may be the same mobile robot discussed with respect to FIGS. 1-7.

The mobile robot 700 may include two holonomic drive modules, each with two wheel assemblies, for a total of four wheel assemblies. The mobile robot 700 may therefore be configured for holonomic locomotion with robust holonomic steering with reduced complexity. For example, the arrows in FIG. 8 illustrate example directions in which the mobile robot 700 can move from a starting position. In some embodiments, the mobile robot 700 may have a range of motion of at least 180 degrees from a standstill starting position. For example, the mobile robot 700 may be configured to move in a lateral direction without having to curve. Because the mobile robot 700 may include more than one holonomic drivetrain module, the mobile robot 700 may include a second drive wheel having a caster angle of substantially zero, a second bearing block assembly vertically aligned with the second drive wheel, and a second steer motor coupled to the second bearing block assembly and vertically aligned with the second drive wheel, where the second drive wheel is independently steerable with respect to the first drive wheel.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 9:
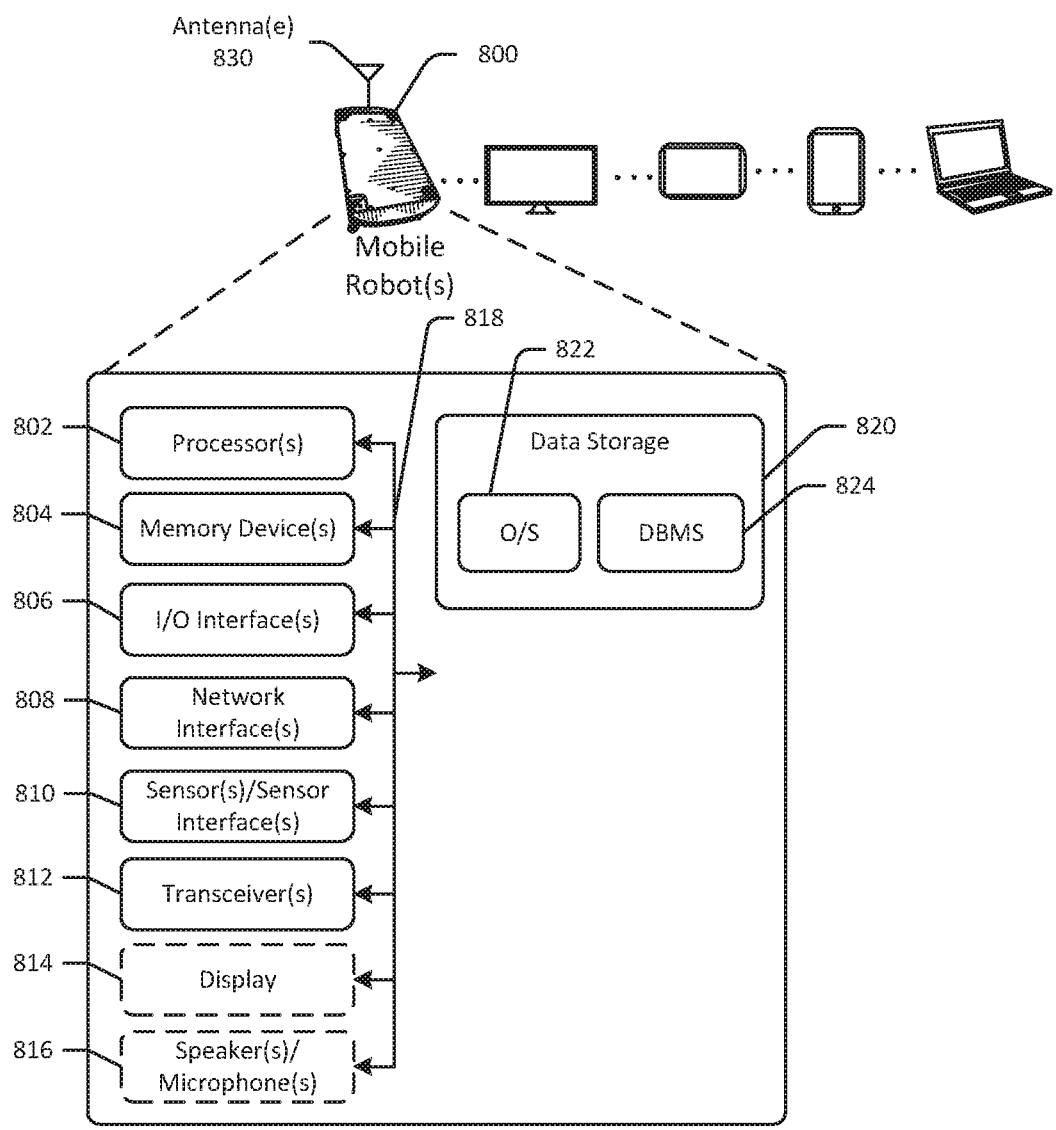
FIG. 9 schematically illustrates an example architecture of a computer system associated with a mobile robot in accordance with one or more embodiments of the disclosure.

FIG. 9 is a schematic block diagram of one or more illustrative mobile robot(s) 800 in accordance with one or more example embodiments of the disclosure. The mobile robot(s) 800 may include or be coupled to any suitable computing device including, but not limited to, a server system, a voice interaction device, a mobile device such as a smartphone, a tablet, an e-reader, a wearable device, or the like; a desktop computer; a laptop computer; a content streaming device; or the like. The mobile robot(s) 800 may correspond to an illustrative device configuration for the device(s) of FIGS. 1-8.

The mobile robot(s) 800 may be configured to communicate with one or more servers, user devices, or the like. The mobile robot(s) 800 may be configured to move autonomously in some or all instances.

The mobile robot(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the mobile robot(s) 800 may include one or more processors (processor(s)) 802, one or more memory devices 804 (also referred to herein as memory 804), one or more input/output (I/O) interface(s) 806, one or more network interface(s) 808, one or more sensor(s) or sensor interface(s) 810, one or more transceiver(s) 812, one or more optional display(s) 814, one or more optional microphone(s) 816, and data storage 820. The mobile robot(s) 800 may further include one or more bus(es) 818 that functionally couple various components of the mobile robot(s) 800. The mobile robot(s) 800 may further include one or more antenna(e) 830 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit the exchange of information (e.g., data (including computer-executable code), signaling, etc.) between various components of the mobile robot(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the mobile robot(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by the components of the mobile robot(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute the computer-executable instructions loaded therein. For example, the processor(s) 802 may be configured to execute the computer-executable instructions of the various program module(s), applications, engines, or the like of the mobile robot(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 820, the O/S 822 may be loaded from the data storage 820 into the memory 804 and may provide an interface between other application software executing on the mobile robot(s) 800 and the hardware resources of the mobile robot(s) 800. More specifically, the O/S 822 may include a set of computer-executable instructions for managing the hardware resources of the mobile robot(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the mobile robot(s) 800 is a mobile device, the DBMS 824 may be any suitable lightweight DBMS optimized for performance on a mobile device.

Referring now to other illustrative components of the mobile robot(s) 800, the input/output (I/O) interface(s) 806 may facilitate the receipt of input information by the mobile robot(s) 800 from one or more I/O devices as well as the output of information from the mobile robot(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the mobile robot(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 830 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The mobile robot(s) 800 may further include one or more network interface(s) 808 via which the mobile robot(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 830 may include any suitable type of antenna depending, for example, on the communications protocols used to transmit or receive signals via the antenna (e) 830. Non-limiting examples of suitable antennae may include directional antennae, non-directional antennae, dipole antennae, folded dipole antennae, patch antennae, multiple-input multiple-output (MIMO) antennae, or the like. The antenna(e) 830 may be communicatively coupled to one or more transceivers 812 or radio components to which or from which signals may be transmitted or received.

As previously described, the antenna(e) 830 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 830 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 830 may be configured to transmit or receive radio frequency signals within any suitable frequency range forming part of the unlicensed portion of the radio spectrum.

The antenna(e) 830 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 830—transmitting or receiving radio frequency (RF) signals in the bandwidth and/or channels corresponding to the communications protocols utilized by the mobile robot(s) 800 to communicate with other devices. The transceiver(s) 812 may include hardware, software, and/or firmware for modulating, transmitting, or receiving—potentially in cooperation with any of antenna(e) 830—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the mobile robot(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 814 may be configured to output light and/or render content. The optional speaker(s)/microphone(s) 816 may be any device configured to receive analog sound input or voice data.

It should be appreciated that the program module(s), applications, computer-executable instructions, code, or the like depicted in FIG. 9 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the mobile robot(s) 800, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 9 may be implemented, at least partially, in hardware and/or firmware across any number of devices.

It should further be appreciated that the mobile robot(s) 800 may include alternate and/or additional hardware, software, or firmware components beyond those described or depicted without departing from the scope of the disclosure. More particularly, it should be appreciated that software, firmware, or hardware components depicted as forming part of the mobile robot(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-8 may be performed by a device having the illustrative configuration depicted in FIG. 9, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. An autonomous cart comprising:
   a chassis; and
   a holonomic drivetrain module removably coupled to the chassis, the holonomic drivetrain module comprising:
      a set of independently controlled wheel assemblies, wherein each of the independently controlled wheel assemblies comprises:
         a bearing block assembly comprising a hollow steer axle;
         a hollow shaft steer motor comprising a gearbox, the hollow shaft steer motor mechanically coupled to a first side of the bearing block assembly and configured to direct drive the hollow steer axle;
         a wheel yoke assembly coupled to a second side of the bearing block assembly; and
         a drive wheel coupled to the wheel yoke, the drive wheel comprising an internal motor, wherein the drive wheel does not have a default caster angle;
         wherein the bearing block assembly, wheel yoke assembly, and hollow shaft steer motor are vertically aligned; and
      a power cable coupled to the drive wheel and a power supply, wherein the power cable is routed through the hollow steer axle and a hollow shaft of the hollow shaft steer motor.

2. The autonomous cart of claim 1, wherein a load from the autonomous cart and payload is transferred from the bearing block assembly to the chassis.

3. The autonomous cart of claim 1, wherein the set of independently controlled wheel assemblies comprises four independently controlled wheel assemblies; and
   wherein each of the four independently controlled wheel assemblies is configured to rotate the respective drive wheels in independent directions in an angular range of at least 180 degrees.

4. The autonomous cart of claim 1, wherein the holonomic drivetrain module further comprises:
   a rotary encoder configured to determine a position of the drive wheel.

5. A mobile robot comprising:
   a chassis; and
   a holonomic drivetrain module removably coupled to the chassis, the holonomic drivetrain module comprising:
      a first drive wheel having a caster angle of substantially zero;

a first bearing block assembly vertically aligned with the first drive wheel; and a first steer motor coupled to the first bearing block assembly and vertically aligned with the first drive wheel.

6. The mobile robot of claim 5, wherein the first drive wheel is configured to independently rotate in an angular range of at least 180 degrees.

7. The mobile robot of claim 5, wherein a load from a payload of the mobile robot is transferred from the first bearing block assembly to the chassis.

8. The mobile robot of claim 5, wherein the first steer motor is configured to move the first drive wheel from a 0 degree position at which the mobile robot is directed in a forward or reverse direction to a 90 degree position at which the mobile robot is directed in a sideways direction.

9. The mobile robot of claim 5, wherein the holonomic drivetrain module further comprises:
a first wheel yoke assembly coupled to a first side of the first bearing block assembly;
wherein the first steer motor is coupled to a second side of the first bearing block assembly.

10. The mobile robot of claim 5, wherein the holonomic drivetrain module is configured to be decoupled from the chassis as a unit.

11. The mobile robot of claim 5, further comprising:
a first encoder configured to reset a position of the first drive wheel.

12. The mobile robot of claim 5, wherein the first bearing block assembly comprises a hollow steer axle, and wherein the first steer motor comprises a hollow shaft and a gearbox.

13. The mobile robot of claim 12, wherein the mobile robot further comprises a power cable, and wherein the first drive wheel comprises:
an in-wheel electric motor;
wherein the power cable is coupled to the in-wheel electric motor and a power supply of the mobile robot, and wherein the power cable is routed through the hollow shaft and the hollow steer axle.

14. The mobile robot of claim 12, wherein the first steer motor is configured to direct drive the hollow steer axle.

15. The mobile robot of claim 5, wherein the holonomic drivetrain module further comprises:
a second drive wheel having a caster angle of substantially zero;
a second bearing block assembly vertically aligned with the second drive wheel; and
a second steer motor coupled to the second bearing block assembly and vertically aligned with the second drive wheel;
wherein the second drive wheel is independently steerable with respect to the first drive wheel.

16. An autonomous cart comprising:
a first drive wheel having a caster angle of substantially zero;
a first bearing block assembly vertically aligned with the first drive wheel;
a first steer motor coupled to the first bearing block assembly and vertically aligned with the first drive wheel;
a second drive wheel having a caster angle of substantially zero;
a second bearing block assembly vertically aligned with the second drive wheel; and
a second steer motor coupled to the second bearing block assembly and vertically aligned with the second drive wheel;
wherein the first drive wheel and the second drive wheel are independently steerable.

17. The autonomous cart of claim 16, wherein the first steer motor and second steer motor are configured to move the respective first drive wheel and second drive wheel from a 0 degree position at which the autonomous cart is directed in a forward or reverse direction to a 90 degree position at which the autonomous cart is directed in a sideways direction.

18. The autonomous cart of claim 16, further comprising:
a chassis;
wherein a load from a payload of the autonomous cart is transferred from the first bearing block assembly and the second bearing block assembly to the chassis.

19. The autonomous cart of claim 16, wherein the first drive wheel and the second drive wheel are configured to independently rotate in an angular range of at least 180 degrees.

20. The autonomous cart of claim 16, further comprising:
a set of encoders configured to reset respective positions of the first drive wheel and the second drive wheel.

* * * * *